May 29, 1923.
J. F. O'CONNOR
1,456,996
ANTIFRICTION BEARING
Filed March 10, 1921
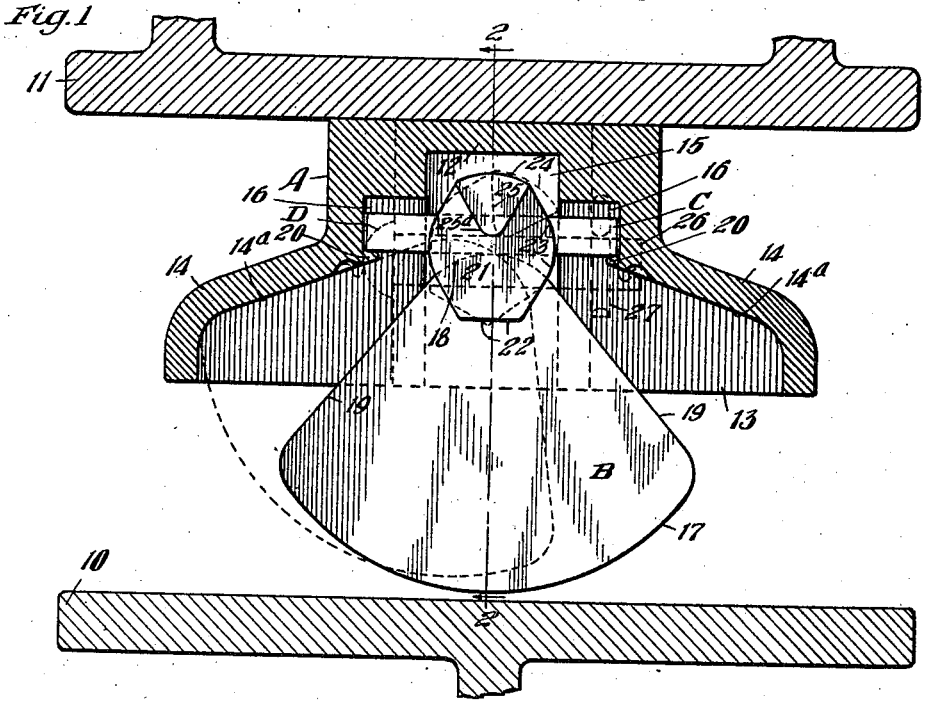
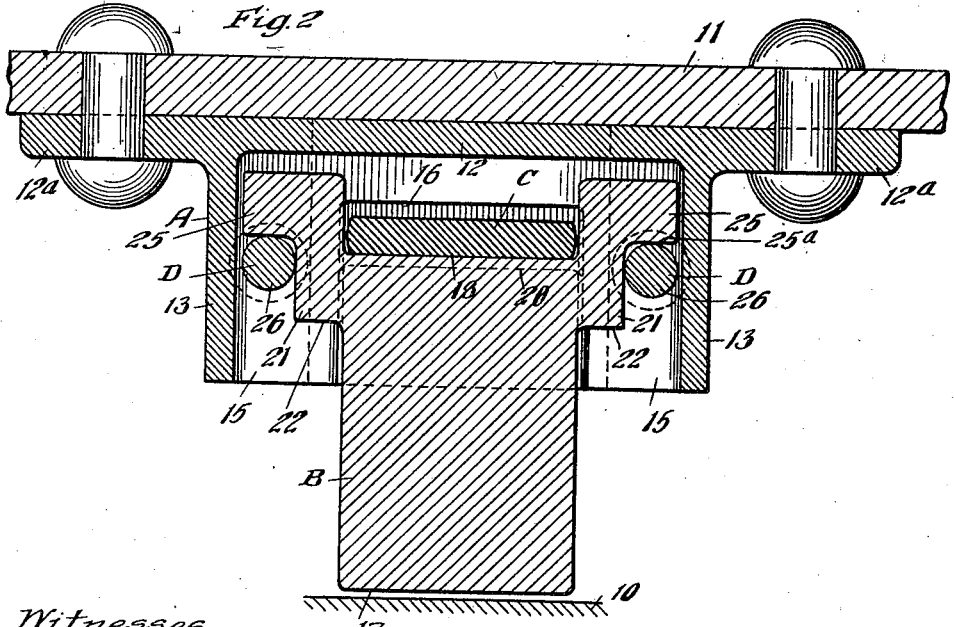
Witnesses
Wm. Geiger
Inventor
John F. O'Connor
By Geo. J. Haight
His Atty.

Patented May 29, 1923.

1,456,996

UNITED STATES PATENT OFFICE.

JOHN F. O'CONNOR, OF CHICAGO, ILLINOIS, ASSIGNOR TO WILLIAM H. MINER, OF CHAZY, NEW YORK.

ANTIFRICTION BEARING.

Application filed March 10, 1921. Serial No. 451,237.

*To all whom it may concern:*

Be it known that I, JOHN F. O'CONNOR, a citizen of the United States, residing at Chicago, in the county of Cook and State of Illinois, have invented a certain new and useful Improvement in Antifriction Bearings, of which the following is a full, clear, concise, and exact description, reference being had to the accompanying drawings, forming a part of this specification.

This invention relates to improvements in anti-friction bearings.

One object of the invention is to provide an anti-friction bearing especially adapted for use as a side bearing on railway cars and wherein the same may be attached to the body bolster of the car and the anti-friction element proper made self-centering under the action of gravity.

More specifically, the object of the invention is to provide a side bearing of the rolling rocker type wherein the friction element is returned under the influence of gravity after removal of the load and in which also are combined means for positively maintaining a definite relation between the anti-friction element and its associated parts.

In the drawing forming a part of this specification, Figure 1 is a vertical, sectional view taken through the ends of a body and truck bolster of a railway car, showing my improvements in connection therewith. And Figure 2 is a vertical, sectional view corresponding substantially to the line 2—2 of Figure 1.

In said drawing, 10 denotes the upper portion of a truck bolster of a railway car and 11 the opposed lower part or section of a body bolster. My improved bearing is shown attached to the body bolster. The improved bearing comprises, broadly, a retaining member or housing or casing A; an anti-friction element proper B; a separate wear or bearing plate C; and supporting pins D—D.

The retaining member A, as shown, has an upper flat wall 12 adapted to lie against the under face of the body bolster, said wall having extensions 12ª—12ª suitably perforated to accommodate rivets or other fastening devices for holding the retaining member rigidly in position. The retaining member A also has dependent vertical side walls 13—13; downwardly sloping end walls 14—14; vertically extending side recesses 16—16 on the interior within which are accommodated the ends of the bearing plate C.

The anti-friction element B is of the rolling rocker type and has a lower curved bearing surface 17 adapted to engage the opposed truck bolster 10. At the top, the element B is provided with another curved bearing surface 18 concentric with the surface 17 but struck on a shorter radius, the two surfaces 17 and 18 being merged with flat surfaces 19—19 arranged preferably tangential to the surface 18. The flat surfaces 19, as best shown by the dotted position of the element B in Figure 1, are adapted to engage with the inner faces 14ª—14ª of the end walls of the retaining member to limit the movements of the element B.

Said bearing surface 18 engages the under face of the insert, preferably steel tempered, bearing plate C which is mounted within the recesses 16, hereinbefore described. Preferably the plate C will be allowed a limited amount of vertical movement as best indicated in Figure 1. Said plate C is held in operative position partly by the element B, which is supported as hereinafter described, and also preferably by small knobs 20—20 on the retaining member A which are bent over to extend underneath the plate C after the latter has been properly inserted. Owing to the fact that there is no backing for the plate C at its center when under load, said plate C is adapted to flex slightly in operation whereby excessive wear from sudden impacts is minimized.

The anti-friction element B, at each end thereof is formed with preferably integral guide lugs 21 of special form. As best shown in Figure 1, each of these lugs has a flat bottom face 22, opposed convex side faces 23—23 and a top rounded face 24. The contour of the side faces 23 is made such that the dimension thereacross in a horizontal direction, in any position of the element B and at the points of contact of the guide lugs with the sides of the recesses 15 will always substantially correspond to the horizontal distance between said side walls of the recesses 15. In this connection, it is to be understood that the lugs 21 are oscillatable within the vertical recesses 15 and, on account of the contour above described, will always serve to maintain a predetermined relation between the anti-friction element B and the retaining member A and prevent any bodily shifting of the element B with respect to the member A while at the same time permitting free oscillating or rolling movements of the element B.

On the outer side of each guide lug 21 there is formed a preferably integral fulcrum or pivotal supporting lug 25 of generally triangular form as best shown in Figure 1, with the lower end thereof rounded as indicated at 25$^a$. Said supporting lugs 25 are normally supported by horizontally extending heavy rivets or pins 26 which are extended through suitable alined perforations in the walls of the retaining member A, said pins being held in place by cotters 27 or other suitable equivalent means.

In operation, as the two bolsters 10 and 11 approach each other and shift radially, the element B will be elevated until the plate C engages against the bottoms of the recesses 16. As the relative radial movement of the bolsters continues, the element B will be rolled, as for instance to the dotted line position shown in Figure 1. Upon separation of the bolsters or removal of the pressure upon the anti-friction element B, the latter will drop downwardly until the supporting lugs 25 bear upon the heavy pins 26 whereupon the weight of the anti-friction element B is sustained by said pins and the anti-friction element is adapted to swing under the influence of gravity back to its normal central position, fulcruming about the rounded edges 25$^a$ of the lugs 25. The employment of the guide lugs 21 insures proper centering of the element B when in its free or normal condition.

I have herein shown and described what I now consider the preferred manner of carrying out the invention, but the same is merely illustrative and I contemplate all changes and modifications that come within the scope of the claims appended hereto.

I claim:

1. In an anti-friction bearing of the character described, adapted to be secured in a depending position on the under side of a bolster or the like, the combination with a retaining member having an upper bearing surface and a fixed supporting means; of an anti-friction rolling element having upper and lower concentric bearing surfaces, the upper bearing surface being arranged to roll upon said bearing surface of the retaining member; co-operating means comprising laterally extending guide lugs on said element and co-acting guide ways in said retaining member, said means being operative in all positions of said element to maintain a predetermined relation therebetween and prevent bodily shifting of the element with respect to the retaining member; and means on said element, distinct from said first named means, fulcrumed on said fixed supporting means on said retaining member above the center of mass of said element, whereby the latter is adapted to return to its normal position, under the influence of gravity, after the removal of the actuating pressure.

2. In an anti-friction bearing of the character described, adapted to be secured in a depending position on the under side of a bolster or the like, the combination with a retaining member, having a fixed supporting means thereon; of an anti-friction rolling element having upper and lower concentric surfaces; a bearing plate mounted within said retaining member and on which said upper bearing surface of said element is adapted to roll; co-operating means comprising laterally extending guide lugs on said element and co-acting guide ways in said retaining member, said means being operative in all positions of said element to maintain a predetermined relation therebetween and prevent bodily shifting of the rolling element with respect to the retaining member and means on said element distinct from said first named means, fulcrumed on said fixed supporting means on said retaining member above the center of mass of said element, whereby the latter is adapted to return to its normal position, under the influence of gravity, after the removal of the actuating pressure.

3. In an anti-friction bearing of the character described adapted to be secured in a depending position on the under side of a bolster or the like, the combination with a retaining member having an upper bearing surface; of an anti-friction rolling element having upper and lower concentric bearing surfaces, the upper bearing surface being arranged to roll upon said bearing surface of the retaining member; cooperating means on said element and retaining member, operative in all positions of said element, to maintain a predetermined relation therebetween and prevent bodily shifting of the element with respect to the retaining member; horizontally extending supports carried by the retaining member and disposed laterally outside of said means on said element; and lugs on said element extending over and adapted to pivot upon said supports to thereby adapt said element to swing to normal position when freed from load.

4. In an anti-friction bearing of the character described, the combination with a hollow retaining member having vertically extending guide recesses on the inner side thereof; of an insert bearing plate on the inner side of said retaining member; a rolling anti-friction element having concentric upper and lower bearing surfaces, the upper bearing surface being adapted to roll upon the under side of said bearing plate, said element having also laterally extended guide lugs disposed within and cooperating with the side walls of said recesses; and means, extended laterally beyond and from said lugs, providing a pivotal support for said element during the return movements thereof.

5. In an anti-friction bearing of the character described, the combination with a hollow retaining member having vertically extending guide recesses on the inner side thereof; of an insert bearing plate on the inner side of said retaining member; a rolling anti-friction element having concentric upper and lower bearing surfaces, the upper bearing surface being adapted to roll upon the under side of said bearing plate, said element having also laterally extended guide lugs disposed within and cooperating with the side walls of said recesses; and means providing a pivotal support for said element during the return movements thereof, said means including fulcrum-forming lugs extended laterally from said guide lugs and horizontally extending supports carried by the retaining member and disposed beneath said fulcrum-forming lugs.

In witness that I claim the foregoing I have hereunto subscribed my name this 25th day of Feb., 1921.

JOHN F. O'CONNOR.

Witnesses:
CARRIE GAILING,
UNA C. PERIN.